United States Patent
Kim et al.

(10) Patent No.: US 12,362,448 B2
(45) Date of Patent: Jul. 15, 2025

(54) ANTENNA FILTER AND ELECTRONIC DEVICE COMPRISING SAME IN WIRELESS COMMUNICATION SYSTEM

(71) Applicant: Samsung Electronics Co., Ltd., Suwon-si (KR)

(72) Inventors: Dongjoo Kim, Suwon-si (KR); Dongsik Shin, Suwon-si (KR); Jonghwa Kim, Suwon-si (KR); Bonmin Koo, Suwon-si (KR); Sewon Gwon, Suwon-si (KR); Inho Na, Suwon-si (KR); Seunghwan Yoon, Suwon-si (KR); Danbi Jeon, Suwon-si (KR); Jongwook Zeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 18/077,436

(22) Filed: Dec. 8, 2022

(65) Prior Publication Data

US 2023/0108020 A1    Apr. 6, 2023

Related U.S. Application Data

(63) Continuation of application No. PCT/KR2021/008835, filed on Jul. 9, 2021.

(30) Foreign Application Priority Data

Jul. 9, 2020  (KR) .................. 10-2020-0084495

(51) Int. Cl.
*H01P 1/205*    (2006.01)
*H01Q 1/24*    (2006.01)
(Continued)

(52) U.S. Cl.
CPC ............ *H01P 1/2053* (2013.01); *H01Q 1/50* (2013.01); *H01Q 21/06* (2013.01); *H01Q 1/246* (2013.01); *H01Q 21/28* (2013.01)

(58) Field of Classification Search
None
See application file for complete search history.

(56) References Cited

U.S. PATENT DOCUMENTS

| | | |
|---|---|---|
| 5,949,309 A | 9/1999 | Correa |
| 9,024,709 B2 | 5/2015 | Joshi et al. |
| (Continued) | | |

FOREIGN PATENT DOCUMENTS

| | | |
|---|---|---|
| CN | 106711558 A | 5/2017 |
| EP | 0 508 733 A2 | 10/1992 |
| (Continued) | | |

OTHER PUBLICATIONS

Extended European Search report dated Nov. 29, 2023, issued in European Application No. 21838328.9-1205.
(Continued)

*Primary Examiner* — Jany Richardson
(74) *Attorney, Agent, or Firm* — Jefferson IP Law, LLP

(57) ABSTRACT

The disclosure relates to a $5^{th}$ generation (5G) or pre-5G communication system for supporting a data transmission rate higher than $4^{th}$ generation (4G) communication systems such as long term evolution (LTE). A radio frequency (RF) filter in a wireless communication system is provided. The RF filter includes a structure including a resonance unit, and a cover plate at which a tuning structure is formed. The tuning structure includes a flexible arrangement with respect to the cover plate through an opening in the cover plate.

17 Claims, 14 Drawing Sheets

(51) Int. Cl.
*H01Q 1/50* (2006.01)
*H01Q 21/06* (2006.01)
*H01Q 21/28* (2006.01)

(56) References Cited

U.S. PATENT DOCUMENTS

| | | |
|---|---|---|
| 9,716,301 B2 | 7/2017 | Park et al. |
| 9,985,330 B2 | 5/2018 | Park et al. |
| 10,090,572 B1 | 10/2018 | Park et al. |
| 10,530,027 B2 | 1/2020 | Tkadlec et al. |
| 2005/0212623 A1* | 9/2005 | Ala-Kojola ............ H01P 1/2053 333/202 |
| 2007/0052495 A1 | 3/2007 | Wada |
| 2009/0237185 A1 | 9/2009 | Raty |
| 2010/0007442 A1* | 1/2010 | Narhi .................... H01P 7/04 333/188 |
| 2010/0046764 A1 | 2/2010 | Wolff |
| 2012/0049982 A1 | 3/2012 | Lee |
| 2014/0327499 A1 | 11/2014 | Park et al. |
| 2015/0280298 A1 | 10/2015 | Shiroyama et al. |
| 2016/0204493 A1 | 7/2016 | Park et al. |
| 2016/0233567 A1 | 8/2016 | Tong et al. |
| 2017/0098878 A1* | 4/2017 | Park .................. H01P 1/2053 |
| 2018/0269553 A1 | 9/2018 | Koo et al. |
| 2019/0252750 A1 | 8/2019 | Kim |
| 2019/0277634 A1 | 9/2019 | Motiee |

FOREIGN PATENT DOCUMENTS

| | | |
|---|---|---|
| JP | 6287031 B2 | 3/2018 |
| KR | 10-2013-0098205 A | 9/2013 |
| KR | 10-2015-0118768 B1 | 10/2015 |
| KR | 10-2016-0049868 A | 5/2016 |
| KR | 10-2017-0040642 A | 4/2017 |
| KR | 10-2018-0114652 A | 10/2018 |
| KR | 10-2019-0081916 A | 7/2019 |
| KR | 10-2074493 B1 | 2/2020 |
| KR | 10-2081950 B1 | 2/2020 |
| KR | 10-2022-0001664 A | 1/2022 |
| KR | 10-2440354 B1 | 9/2022 |
| WO | 2009/000862 A2 | 12/2008 |
| WO | 2017/061675 A1 | 4/2017 |
| WO | 2019/199096 A1 | 10/2019 |

OTHER PUBLICATIONS

Indian Office Action dated Mar. 1, 2024, issued in Indian Application No. 202317008111.
Korean Office Action dated Oct. 2, 2024, issued in Korean Patent Application No. 10-2020-0084495.
Chinese Office Action dated Jun. 7, 2025, issued in a Chinese Patent Application No. 202180049089.9.
European Office Action dated Mar. 7, 2025, issued in European Patent Application No. 21838328.9.

* cited by examiner

ANTENNA FILTER AND ELECTRONIC DEVICE COMPRISING SAME IN WIRELESS COMMUNICATION SYSTEM

CROSS-REFERENCE TO RELATED APPLICATION(S)

This application is a continuation application, claiming priority under § 365 (c), of an International application No. PCT/KR2021/008835, filed on Jul. 9, 2021, which is based on and claims the benefit of a Korean patent application number 10-2020-0084495, filed on Jul. 9, 2020, in the Korean Intellectual Property Office, the disclosure of which is incorporated by reference herein in its entirety.

BACKGROUND

1. Field

The disclosure relates to a wireless communication system. More particularly, the disclosure relates to an antenna filter in a wireless communication system, and an electronic device including the same.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long-term evolution (post LTE)" system.

The 5G communication system is considered to be implemented in ultrahigh frequency millimeter wave (mmWave) bands (e.g., 60 gigahertz (GHz) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Products each equipped with multiple antennas have been developed to enhance communication performance, and it is expected that devices each having a much larger number of antennas will be used by utilizing massive MIMO technology. As the number of antenna elements used in a communication device increases, the number of RF parts (e.g., a filter, etc.) inevitably increases accordingly.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for tuning a radio frequency (RF) filter in a wireless communication system.

Another aspect of the disclosure is to provide a tuning structure of an RF filter in a wireless communication system.

Another aspect of the disclosure is to provide a cover structure including a tuning structure for tuning characteristics of a filter in a wireless communication system.

Another aspect of the disclosure is to provide a device and method for performing tuning through a see-saw structure of a cover plate of an RF filter in a wireless communication system.

Additional aspects will be set forth in part in the description which follows and, in part, will be apparent from the description, or may be learned by practice of the presented embodiments.

In accordance with an aspect of the disclosure, a radio frequency (RF) filter in a wireless communication system is provided. The RF filter includes a structure including a resonance unit, and a cover plate at which a tuning structure is formed. The tuning structure is configured to have a flexible arrangement with respect to the cover plate, through an opening in the cover plate.

In accordance with another aspect of the disclosure, a massive multiple-input multiple-output (MIMO) unit (MMU) device in a wireless communication system is provided. The MMU device includes at least one processor configured to process a signal, a plurality of radio frequency (RF) filters configured to filter a signal, and an antenna array configured to radiate a signal. An RF filer among the plurality of RF filters includes a structure includes a resonance unit and a cover plate at which a tuning structure is formed, and the tuning structure is configured to have a flexible arrangement with respect to the cover plate through an opening in the cover plate.

A device and method according to various embodiments of the disclosure is capable of providing a wide tuning range for characteristic improvement and achieving reduction of the volume and weight of a radio frequency (RF) filter, through a cover structure of the RF filter including a tuning structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
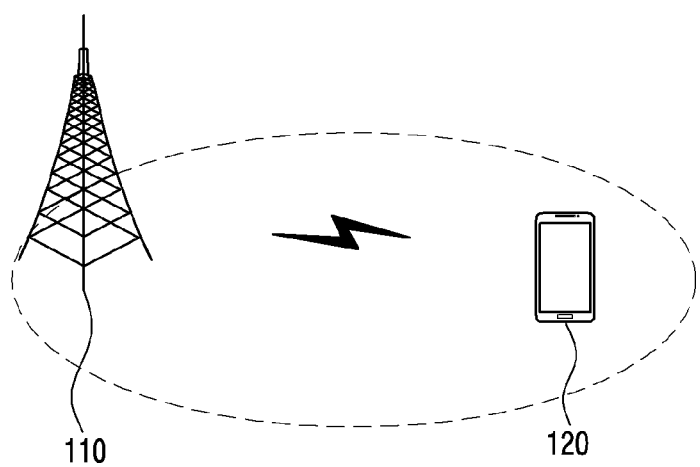
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Terms (e.g., a substrate, a plate, a print circuit board (PCB), a flexible PCB (FPCB), a module, an antenna, an antenna element, a circuit, a processor, a chip, a component, a device) referring to parts of electronic devices, terms referring to the shape of a part (e.g., a tuning member, a tuning structure, a tuning structure body, a structure, a support, a contact, a protrusion, an opening), terms (e.g., a connection, a contact, a support, a contact structure, a conductive member, an assembly) referring to the connection between structure bodies, terms (e.g., a transmission line, a PCB, an FPCB, a signal line, a feeding line, a data line, an RF signal line, an antenna line, an RF path, an RF module, an RF circuit) referring to circuit, and the like, which are used in the following description, are exemplified for convenience of description. Accordingly, the disclosure is not limited to the terms described below, and other terms having equivalent technical meanings may be used. In addition, terms such as " . . . part," " . . . group," " . . . material," and " . . . body" used below may mean at least one shape structure or a unit for processing a function.

Furthermore, as used in the disclosure, the expression "greater than" or "less than" is used to determine whether a specific condition is satisfied or fulfilled, but this is intended only to illustrate an example and does not exclude "greater than or equal to" or "equal to or less than." A condition indicated by the expression "greater than or equal to" may be replaced with a condition indicated by "greater than," a condition indicated by the expression "equal to or less than" may be replaced with a condition indicated by "less than," and a condition indicated by "greater than and equal to or less than" may be replaced with a condition indicated by "greater than and less than."

Furthermore, in the disclosure, various embodiments will be described using terms employed in some communication standards (e.g., the 3rd generation partnership project (3GPP) and institute of electrical and electronics engineers (IEEE)), but they are only for the sake of illustration. The embodiments of the disclosure may also be easily applied to other communication systems through modifications.

Hereinafter, the disclosure relates to an antenna filter in a wireless communication system, and an electronic device including the same. Specifically, the disclosure describes a technology for achieving a wide tuning range and reducing the volume and weight of a product by forming a tuning structure having a flexible arrangement at a cover of an RF filter, as a tuning operation for controlling the characteristics of a radio frequency (RF) filter in a wireless communication system, instead of screwing using tuning bolts and nuts.

FIG. 1A illustrates a wireless communication system according to an embodiment of the disclosure. The wireless communication environment in FIG. 1A illustrates a base station and a terminal as a part of nodes using a wireless channel.

Referring to FIG. 1A, a base station 110 is a network infrastructure that provides a wireless connection to a terminal 120. The base station 110 has coverage defined as a certain geographic region, based on a distance at which a signal can be transmitted. The base station 110 may be referred to as, other than a base station, a "massive multiple-input multiple-output (MIMO) unit (MMU)," an "access point (AP)," an "eNodeB (eNB)," a "5th generation node (5G node)," a "5G NodeB (5G NB)," a "wireless point," a "transmission/reception point (TRP)," an "access unit," a "distributed unit (DU)," a "radio unit (RU)," a "remote radio head (RRH)," or other terms having an equivalent technical meaning. The base station 110 may transmit a downlink signal or receive an uplink signal.

The terminal 120, which is a device used by a user, performs communication with the base station 110 through a wireless channel. In some cases, the terminal 120 may be operated without the user's involvement. That is, the terminal 120 serving as a device that performs machine type communication (MTC) may not be carried by a user. The terminal 120 may be referred, other than a terminal, to as "user equipment (UE)," "mobile station," "subscriber station," "customer premises equipment (CPE)," "remote terminal," "wireless terminal," "electronic device," "vehicle terminal," "user device," or another term having an equivalent technical meaning.

Figure 1B:
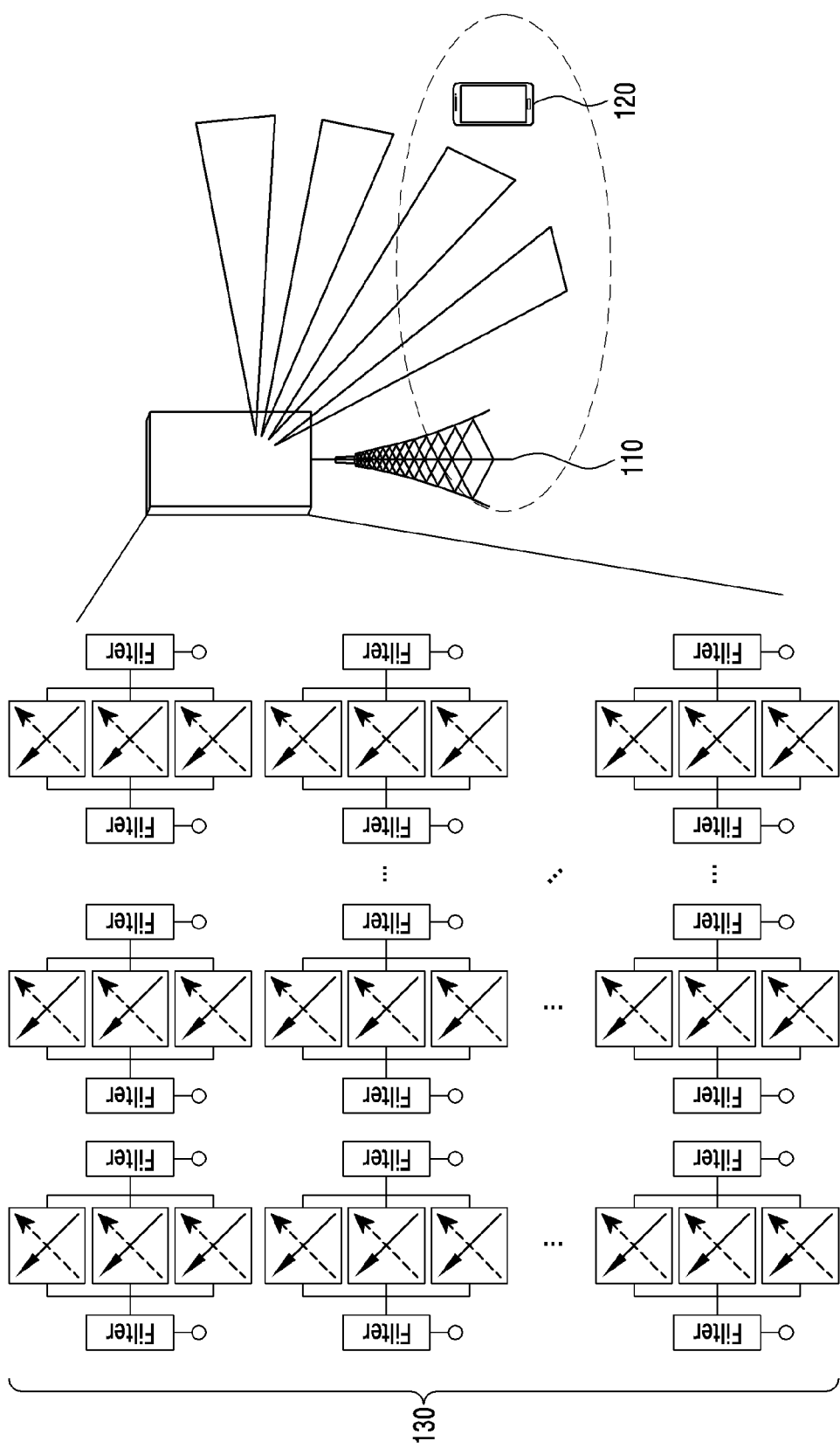
FIG. 1B illustrates an example of an antenna array in a wireless communication system according to an embodiment of the disclosure.

FIG. 1B illustrates an example of an antenna array in a wireless communication system according to an embodiment of the disclosure.

Beamforming technology is used as one of the technologies for reducing propagation path loss and increasing the propagation distance. In general, beamforming concentrates a wave arrival region by using a plurality of antennas or increases the directivity of reception sensitivity in a specific direction. Accordingly, in order to form a beamforming coverage instead of forming a signal in an isotropic pattern by using a single antenna, the base station 110 may include a plurality of antennas. Hereinafter, an antenna array including a plurality of antennas will be described. The example of the antenna array shown in FIG. 1B is only an example for describing embodiments of the disclosure, and is not construed as limiting other embodiments of the disclosure.

Referring to FIG. 1B, a base station 110 may include an antenna array 130. According to an embodiment, the base station 110 may include a massive MIMO unit (MMU) including the antenna array 130. Each antenna included in the antenna array 130 may be referred to as an array element or an antenna element. In FIG. 1B, the antenna array 130 is illustrated as a two-dimensional planar array, but this is only an example and does not limit other embodiments of the disclosure. According to another embodiment, the antenna array 130 may be configured in various forms, such as a linear array. The antenna array may be referred to as a massive antenna array.

A major technology for improving the data capacity of 5G communication is the beamforming technology using an antenna array connected to multiple RF paths. For higher data capacity, the number of RF paths needs to be increased or the power per RF path needs to be increased. The size of a product becomes larger when the number of RF paths is increased, and due to space constraints in installing actual base station equipment, the number of base stations cannot be increased any more currently. In order to increase the antenna gain through high output without increasing the number of RF paths, a plurality of antenna elements may be connected using a splitter (or a divider) to RF paths, thereby increasing the antenna gain.

To increase communication performance, the number of antennas (or antenna elements) of the equipment (e.g., the base station 110) performing wireless communication is increasing. In addition, the number of RF parts (e.g., amplifiers, filters, etc.) and components for processing an RF signal received or transmitted through the antenna element is also increased, and thus, the communication equipment is necessarily configured to have spatial gain and cost efficiency while satisfying communication performance. As the number of paths increases, the number of filters for processing a signal in each antenna element also increases.

The RF filter may include a circuit that performs filtering to transmit a radio signal of a desired frequency by forming resonance. That is, the RF filter may perform a function for selectively identifying a frequency. Such an RF filter serving as an important component for selecting and attenuating a frequency is used in most communication equipment. There are filters such as ceramic filters and bulk acoustic wave (BAW) filters, which have many advantages in terms of volume reduction. However, since the cavity filter has excellent performance in terms of power handling and capacity/insertion loss/attenuation, the cavity filter is used in various communication equipment. Even through ceramic filters and BAW filters can be used in MMU/small cells that require small power specifications, the cavity filter is continuously required to be used in high-performance MMUs and all remote radio units (RRUs). Therefore, volume/weight reduction and unit cost of the cavity filter are very important factors in securing the competitiveness of communication equipment.

Figure 2:
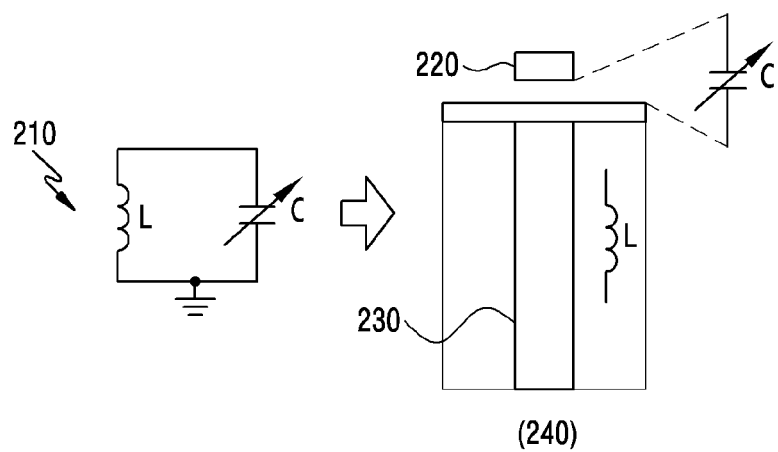
FIG. 2 describes a tuning principle of a radio frequency (RF) filter according to an embodiment of the disclosure.

FIG. 2 illustrates a tuning principle of a radio frequency (RF) filter according to an embodiment of the disclosure.

Cavity filters, which are mainly used in communication equipment, employ machined products such as housings and resonators as main parts. The characteristics of the RF filter are determined by the shape and structure of the part. However, when manufacturing a cavity filter (e.g., a metal cavity filter), there is a difference between a part in a simulated state and an implemented actual part. Due to the machining tolerance of parts and differences in material information, there are factors that are difficult to grasp through simulation. In addition, since there is a manufacturing limitation in increasing the precision of parts, it is economically advantageous to tune the characteristics of the filter for high performance through a tuning operation. At this time, since the machining tolerance of the part affects the electrical performance, a tuning process for correcting the machining tolerance is required when manufacturing the cavity filter. The time and the tuning structure according to the tuning process are important factors in determining the volume/weight reduction and unit cost of the RF filter.

Referring to FIG. 2, the RF filter may include a resonator 240 (e.g., a coaxial resonator) disposed in a cavity. According to an embodiment, the RF filter may include a cavity filter. The resonator 240 may form resonance through a distance between a conductor (e.g., a cover plate or tuning unit 220) and another conductor (e.g., a coaxial transmission line 230). Specifically, the coaxial transmission line 230 of the resonator 240 may serve as an inductor. The coaxial transmission line 230 and the conductor spaced apart from the upper portion of the coaxial transmission line 230 may serve as a capacitor. That is, the RF filter may be expressed as a tuning circuit 210 of an LC circuit. The tuning operation for tuning the characteristics of the RF filter includes correction of a resonance frequency according to machining tolerances of the housing and the resonator. Since the resonance frequency of the LC circuit depends on the capacitance value, the resonance frequency may be adjusted by adjusting the capacitance value. In general, the capacitance value of the capacitor may be determined based on the following equation.

$$C = \epsilon \frac{A}{d} \qquad \text{Equation 1}$$

Here, C denotes a capacitance value, & denotes a dielectric constant, A denotes an area of a conductor, and d denotes a distance between the conductors. Through the principle described above, the capacitor has a different capacitance value according to the distance between the two conductors (i.e., the distance between the tuning unit 220 and the resonator 240 (more specifically, the coaxial transmission line 230)) or a conductor area (e.g., an area of the tuning unit 220 and the resonator 240 facing each other) that is relatively disposed. In order to tune the characteristics of the RF filter, the height of the tuning unit 220 is adjusted. The distance between the tuning unit 220 and the resonator 240 may be adjusted by adjusting the height of the tuning unit 220. For example, when the height of the tuning unit 220 is increased, the distance between the tuning unit 220 and the resonator 240 is increased, and this change causes a change in the capacitance value. When the height of the tuning unit 220 is decreased, the distance between the tuning unit 220 and the resonator 240 is decreased, and thus the capacitance value is changed.

As a method for adjusting the height of the tuning unit 220 includes forming a groove in the cover of a filter, inserting a tuning bolt into the formed groove, and spacing the same. Due to the spacing between the resonator and the tuning bolt, the resonance frequency is adjusted by adjusting the capacitance value. However, this method requires additional space of the screw and nut of the tuning bolt (e.g., about 20% for the space outside the design in the case of a 25 mm thick filter), and distortion of characteristics due to tightening of the nut arises. In addition, as another method for adjusting the height of the tuning unit 220 includes a tuning method in which the distance to the resonator is narrowed by hitting a cover itself. However, since the cover needs to be manually lifted for correction when over-hitting occurs during automatic tuning, this method is not suitable for automatic tuning as well.

The tuning structure through the bolt has a relatively large size, and the volume-reduced plate tuning structure is less productive because manual restoration is involved in the tuning process thereof. Low productivity causes an increase in unit price. In addition, when using a tuning structure through a bolt, a separate material (e.g., a nut) is required for fixing the bolt, and each resonator is sensitive and thus needs to be individually tuned through a screw. Such tuning is a factor that lowers mass productivity, causes a high defect rate, and increases the price of the filter. In order to solve these problems and replace the existing tuning structure (e.g., tuning bolt) and tuning method (e.g., automatic adjustment of a tuning bolt), the disclosure proposes a structure having a tuning unit provided at a cover.

Figure 3A:
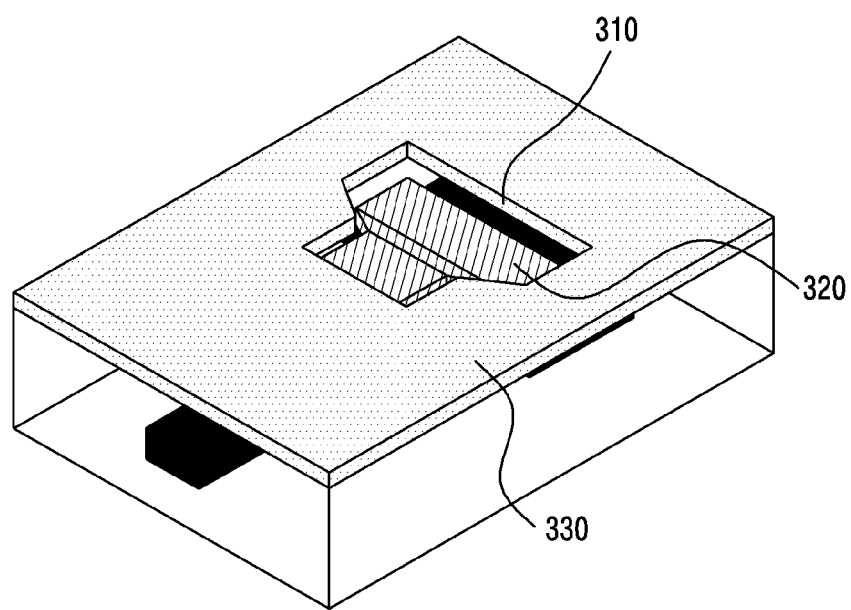
FIG. 3A illustrates an example of a cover plate at which a tuning structure is formed according to an embodiment of the disclosure.

FIG. 3A illustrates an example of a cover plate at which a tuning structure is formed according to an embodiment of the disclosure.

The tuning structure is a structure for generating a distance difference from the resonator due to the adjustment of the position, which is attached to the cover plate. The tuning structure may be disposed on a member of the cover plate. According to an embodiment, the tuning structure may be formed by a portion of a metal plate forming the cover plate. Hereinafter, in the disclosure, a structure connected to the cover plate to tune a resonance frequency through a flexible arrangement is referred to as a tuning structure or a tuning member. However, in addition to the terms described above, various terms meaning equivalent functions, such as a tuning plate, a tuning structure, a metal protrusion, and a fluid conductor, may be used interchangeably. In addition, a single plate or a bent plate is exemplarily shown as an example of the shape of the tuning structure, but the shape of the tuning member may be implemented in various shapes (e.g., a spherical shape, a column shape, a protrusion) and by various methods.

Referring to FIG. 3A, a cover plate 330 may be disposed on the upper surface of the resonator filter. According to an embodiment, the cover plate 330 may be formed of a metal plate. A portion of the cover plate 330 may be cut. An opening may be formed in the cover plate 330 by cutting a portion of the cover plate 330. A tuning structure 320 is disposed in at least a portion of the formed opening. A cut opening 310 is formed according to the arrangement of the opening and the tuning structure 320. The tuning structure 320 may be formed by a portion of a metal plate constituting the cover plate 330. The volume of the tuning structure 320 may be reduced through a thin filter cover plate having an aperture structure without using a tuning bolt.

According to various embodiments, the material of the tuning structure 320 may be a metal. For example, the material of the tuning structure 320 may include at least one of aluminum (Al), iron (Fe), nickel (Ni), copper (Cu), or brass. A region of the cover plate 330 may be cut, and at least a portion of the cut portion may be formed as the tuning structure 320. According to an embodiment, the tuning structure 320 may be made of the same material (e.g., metal) as the cover plate 330. Since the tuning structure 320 is manufactured integrally with the cover plate 330, separate parts such as bolts or nuts are not required, and a groove is not required to be formed in the metal plate, and accordingly, the tuning structure 320 can reduce the production cost. In addition, since the cover plate 330 and the tuning structure 320 are formed together in the metal plate, the manufacturing tolerance is reduced. Reduced manufacturing tolerances may improve performance of antennas in which multiple filters are used. The disclosure describes embodiments in which the tuning structure is integrally formed with the cover plate member, but embodiments of the disclosure are not limited thereto. The tuning structure of the disclosure formed by separately attaching the tuning structure to the cover plate member including an aperture may also be understood as an embodiment of the disclosure.

According to various embodiments, the tuning structure 320 may be flexibly disposed. The tuning structure 320 may be flexibly disposed with respect to the cover plate 330. In the disclosure, the flexible arrangement refers to a structure allowing insertion (an arrangement in which the tuning structure 320 is positioned between the surface of the cover plate 330 and the resonator of the resonance unit) and restoration (an arrangement in which after insertion, the tuning structure 320 is arranged toward the surface of the cover plate 330 again). The tuning structure 320 may be arranged at various locations by an adjustment operation such as a hit or press. According to an embodiment, the adjustment operation may be performed by an automatic adjustment device for the RF filter. A partial region of the tuning structure 320 may be fixed to the cover plate 330 such that the tuning structure 320 is arranged at various positions more easily by a physical external force. Various positions may provide various separation distances between the resonator and the tuning structure.

Figure 3B:
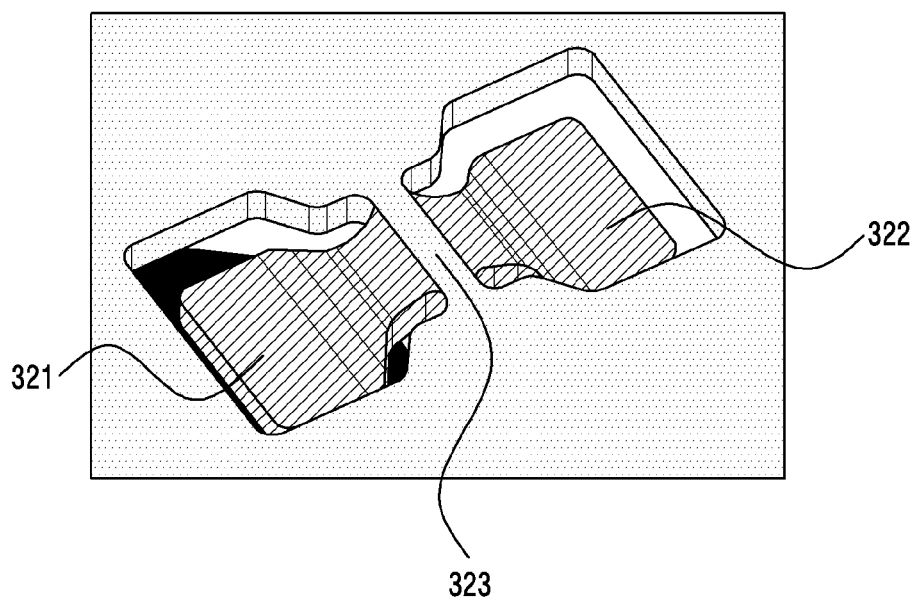
FIG. 3B illustrates another example of a cover plate at which a tuning structure is formed according to an embodiment of the disclosure.

FIG. 3B illustrates another example of a cover plate at which a tuning structure is formed according to an embodiment of the disclosure. Unlike shown in FIG. 3A, the tuning structure in FIG. 3B may include structures having a see-saw structure. Insertion and restoration may be performed more freely through the tuning structures having a see-saw structure.

Referring to FIG. 3B, the cover plate may include a fixing unit 323 as a fixing region for balancing the see-saw structure. The see-saw structure refers to structures in which, at both ends with respect to the fixing unit 323, when one end 321 rises, other end 322 descends, and when the other end 322 rises, the one end 321 descends. Through the see-saw structure, insertion and restoration can be configured more freely, and an automated tuning structure can be easily secured through hitting.

Figure 3C:
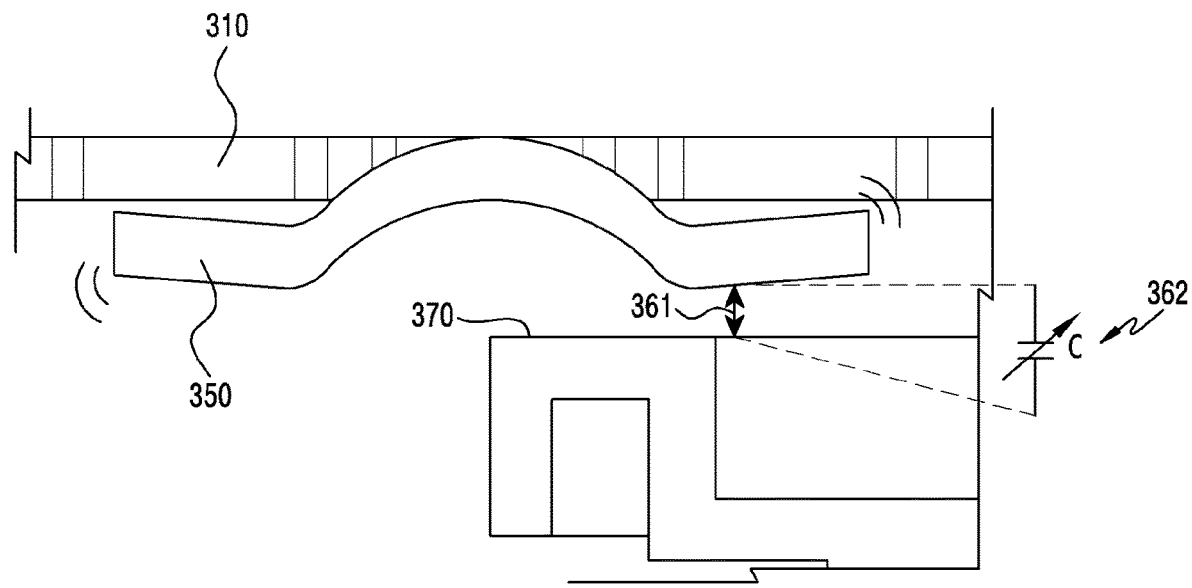
FIG. 3C describes a tuning principle according to an arrangement of a tuning structure provided at a cover plate according to an embodiment of the disclosure.

FIG. 3C illustrates a tuning principle according to the arrangement of a tuning structure provided at a cover plate according to an embodiment of the disclosure. The tuning structure may be configured to tune a resonance frequency characteristic of the RF filter. Although FIG. 3C illustrates the tuning structures having the see-saw structure shown in FIG. 3B, the tuning principle described through FIG. 3C is not limited to the see-saw structure.

Referring to FIG. 3C, a tuning structure 350 may be attached to the cover plate 330 to have a flexible arrangement. The tuning structure 350 may be positioned such that the left side of the tuning structure 350 is raised and the right side of the tuning structure 350 is lowered, or the right side of the tuning structure 350 is raised and the left side of the tuning structure 350 is lowered. A spacing 361 is formed between the tuning structure 350 and resonator 370. The spacing 361 may provide capacitance 362 because the tuning structure 350 and resonator 370 are both formed as conductors. The resonator 370 provides inductance through the transmission line.

Through the capacitance 362 and the inductance, the tuning structure of the RF filter may function as an LC circuit. The RF filter may select and pass a specific frequency through resonance of the LC circuit. In this case, the specific frequency is referred to as a resonance frequency. The characteristics of the RF filter may include a resonance frequency. As the tuning structure 350 is positioned closer to the resonator 370, the length of the spacing 361 decreases. The reduced length provides a high capacitance value, which forms a resonance at higher frequencies. The tuning structure 350 may move the resonance frequency upward or move the resonance frequency downward through the spacing 361 which is a distance from the resonator 370 to the tuning structure. The magnetic field of the RF filter is tuned.

Instead of the existing tuning structure and method of tuning a resonance frequency through a screw of a tuning bolt, the resonance frequency may be tuned using the tuning structure provided at the cover plate of the disclosure. The spacing between the tuning structure 350 and the resonator is adjusted by lowering or raising (i.e., insertion or restoration) the position of the tuning structure 350 disposed within the aperture of the cover plate. The adjustment of the spacing may provide tuning of a resonance frequency. Since one area of the cover plate functions as the tuning structure 350 in addition to a cover, a nut and thickness of a cover for a tuning bolt are not required, and thus the volume of the filter may be reduced.

Figure 4A:
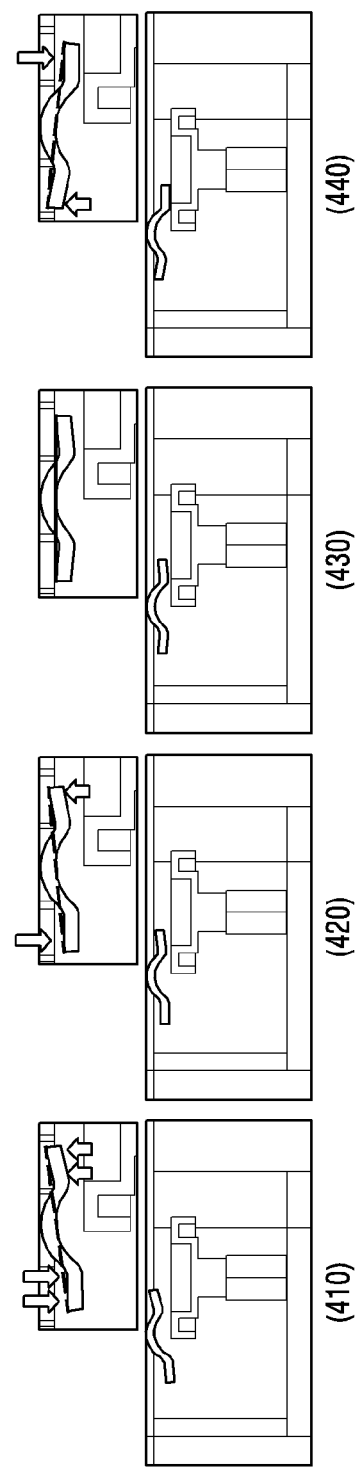
FIG. 4A illustrates examples of tuning ranges based on an arrangement of a tuning structure according to an embodiment of the disclosure.

FIG. 4A illustrates examples of tuning ranges based on an arrangement of a tuning structure according to an embodiment of the disclosure.

The tuning structure is disposed in the aperture formed by the cut of the cover plate and may be arranged flexibly. The spatial arrangement of the tuning structures is determined by adjustment operations such as a hit or press. According to an embodiment, the tuning structure may be manufactured and formed (e.g., mold pressing) integrally with the cover plate. According to the position and the degree of pressure applied to the tuning structure, the tuning characteristics of the tuning structure may be determined. As an example, the tuning plates are described as having the see-saw structure shown in FIG. 3B, but embodiments of the disclosure are not necessarily limited thereto.

Referring to FIG. 4A, in first example 410, the tuning structure may be disposed at a position rotated by about (−)8 degrees clockwise with respect to a fixing unit (e.g., the fixing unit 323). A hit or press may be applied to the left region of the tuning structure. As the left region of the tuning structure descends, the right region may rise. The distance between the tuning structure and the resonator may increase due to the rise of the right region. An increase in the distance between the tuning structure and the resonator may cause a decrease in the capacitance of the RF filter. The decrease in capacitance provides downward movement of the resonance frequency. To tune the resonance frequency low, the arrangement of the tuning structure according to the first example 410 may be used.

In second example 420, the tuning structure may be disposed at a position rotated by about (−)4 degrees clockwise with respect to the fixing unit (e.g., the fixing unit 323). A hit or press may be applied to the left region of the tuning structure. At this time, a less intense a hit or press than in the first example 410 may be applied to the tuning structure. As the left region of the tuning structure descends, the right area may rise. The distance between the tuning structure and the resonator may increase due to the rise of the right region. An increase in the distance between the tuning structure and the resonator may cause a decrease in the capacitance of the RF filter. The decrease in capacitance provides downward movement of the resonance frequency. However, due to the relatively lower decrease in capacitance than that provided in the first example 410, the tuning structure according to the second example 420 may provide downward movement of the resonance frequency having relatively smaller magnitude than that by the tuning according to the first example 410.

In third example 430, the tuning structure may be disposed at a position substantially parallel to the cover plate with respect to the fixing unit (e.g., the fixing unit 323). The tuning structure may not be subjected to adjustment operations, such as an additional hit or press. This is because additional tuning may not be necessary when the distance between the resonator and the cover plate including the tuning structure according to the manufacturing process provides the required resonance frequency characteristics.

In fourth example 440, the tuning structure may be disposed at a position rotated by about (+)4 degrees in a clockwise direction with respect to the fixing unit (e.g., the fixing unit 323). A hit or press may be applied to the right region of the tuning structure. At this time, a less intense hit or press than in the first example 410 may be applied to the tuning structure. A hit or press of the identical or similar intensity to the second example 420 may be applied to the tuning structure. As the right region of the tuning structure descends, the left region may rise. Due to the descent in the right region, the distance between the tuning structure and the resonator may decrease. A decrease in the distance between the tuning structure and the resonator may result in an increase in the capacitance of the RF filter. An increase in capacitance provides upward movement of the resonance frequency. To tune the resonance frequency high, the arrangement of the tuning structure according to the fourth example 440 may be used.

Figure 4B:
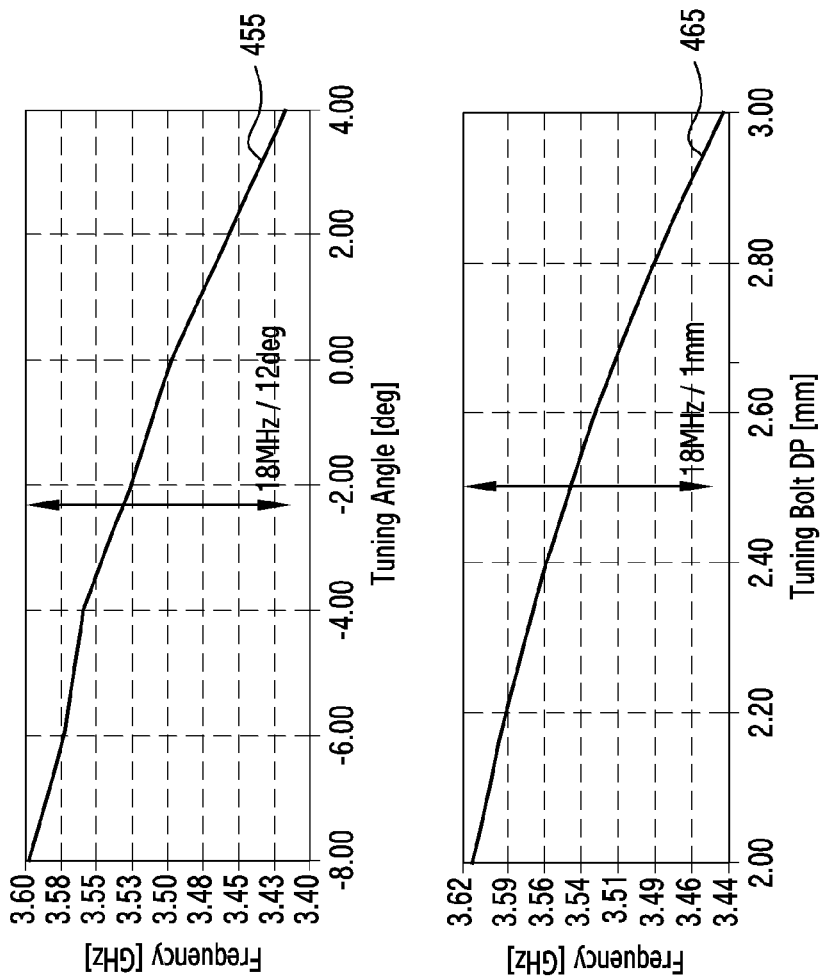
FIG. 4B illustrates performance based on an arrangement of a tuning structure according to an embodiment of the disclosure.
Figure 4B:
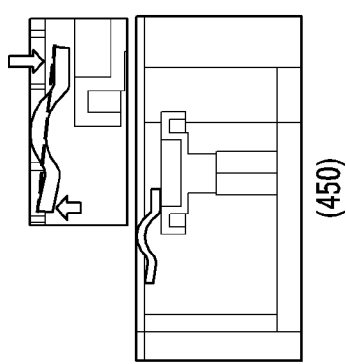
Figure 4B:
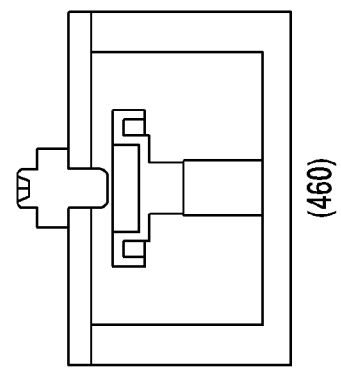

FIG. 4B illustrates performance based on an arrangement of a tuning structure according to an embodiment of the disclosure.

According to the change in the resonance frequency characteristic of the RF filter according to the operating range of the tuning structure (e.g., an angular range for the tuning structures having the see-saw structure in FIG. 3B, and the depth range of the bolt for the existing tuning bolt), the performance of the tuning structure may be identified.

Referring to FIG. 4B, first graph 455 shows the performance of an RF filter 450 through the tuning structure provided at the cover plate proposed in the disclosure. The horizontal axis of the first graph 455 indicates a tuning range of the tuning structure, and the vertical axis indicates a range of the resonance frequency of the tuning structure. For the range of the resonance frequency of 18 MHz, the rotation range of the tuning structure has a movement range of (−)8 degrees to (+)4 degrees. Second graph 465 shows an RF filter 460 through the existing tuning bolts. The horizontal axis of the second graph 465 indicates a movement range of the tuning bolt, and the vertical axis indicates a range of the resonance frequency of the tuning bolt. For the resonance frequency range of 18 MHz, the existing tuning bolt has a movement range of 2 mm to 3 mm. As noted from the first graph 455 and the second graph 465, tuning bolt level-resonance frequency tuning is possible through the tuning having the see-saw structure. Particularly, since the thickness difference may be reduced by 1 mm through the rotation range of about 12 degrees, the volume of the RF filter may be reduced during the tuning operation using the tuning structure provided at the cover plate.

Figure 5A:
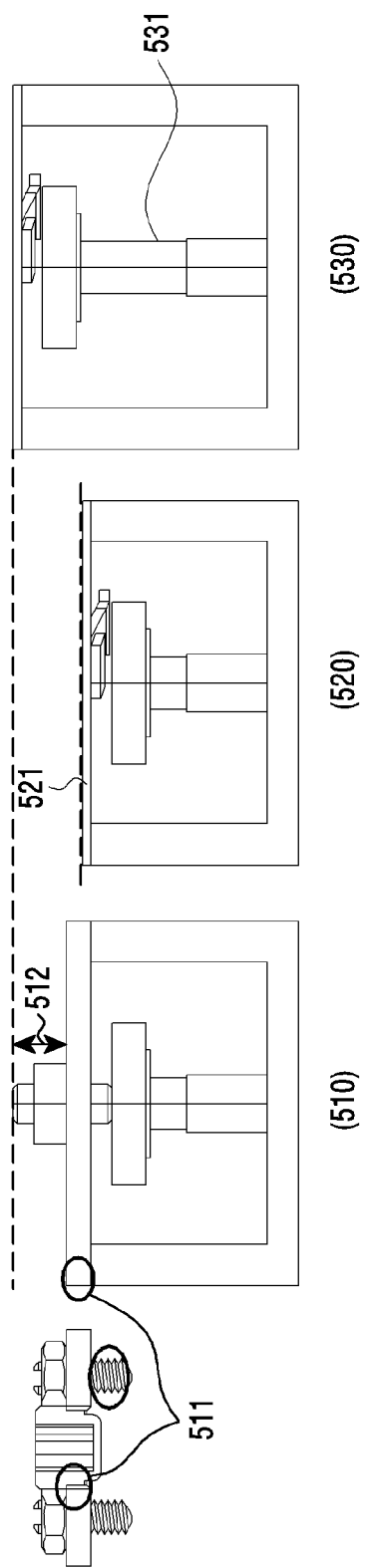
FIG. 5A illustrates an example of a structure of an RF filter including a tuning structure according to an embodiment of the disclosure.

FIG. 5A illustrates an example of a structure of an RF filter including a tuning structure according to an embodiment of the disclosure. In order to describe the design of the tuning structure and the RF filter through the same according to embodiments of the disclosure, an RF filter including the existing tuning structure employing a tuning bolt is used as a comparison object.

Referring to FIG. 5A, a first RF filter 510 may include a tuning structure according to a tuning bolt. The tuning bolt is positioned through a screw of a groove in the cover. At this time, the thickness of the cover is increased to secure the screw thread and screw groove structure 511 (about 1.2 mm). In addition, a predetermined space is additionally required for a structure 512 of a tuning bolt on the upper surface of the cover and a nut for fixing the same (e.g., about 2.5 mm).

A second RF filter 520 may include a tuning structure according to the tuning structure provided at the cover plate. Instead of a tuning bolt, a tuning structure having an adaptive arrangement by pressure may be used. Since the tuning structure is formed as one conductor together with the cover plate, the tuning structure does not require a special structure such as screw threads and screw groove of the tuning bolt. The cover plate of the second RF filter 520 may be thinner than the cover plate of the first RF filter 510. That is, a thickness 521 of the cover may be reduced (e.g., the thickness is about 0.5 mm). In addition, since the second RF filter 520 does not require an additional structure (bolts and nuts), the size of the filter may be reduced compared to the first RF filter 510.

A third RF filter 530 may include a tuning structure according to the tuning structure provided at the cover plate. A reduction in the size of the upper surface of the cover of the RF filter may allow an increase in the size of a resonator region 531, that is, the size of the resonance unit. The increase in the resonator region 531 may increase the degree of freedom in designing the cavity and the resonator. A high degree of freedom may provide an improvement in the quality factor. Accordingly, for the same space, a relatively free space region may be utilized by performing a tuning operation through the tuning structure provided at the cover plate. Through this, the performance of the RF filter may be improved by securing an additional quality factor.

Figure 5B:
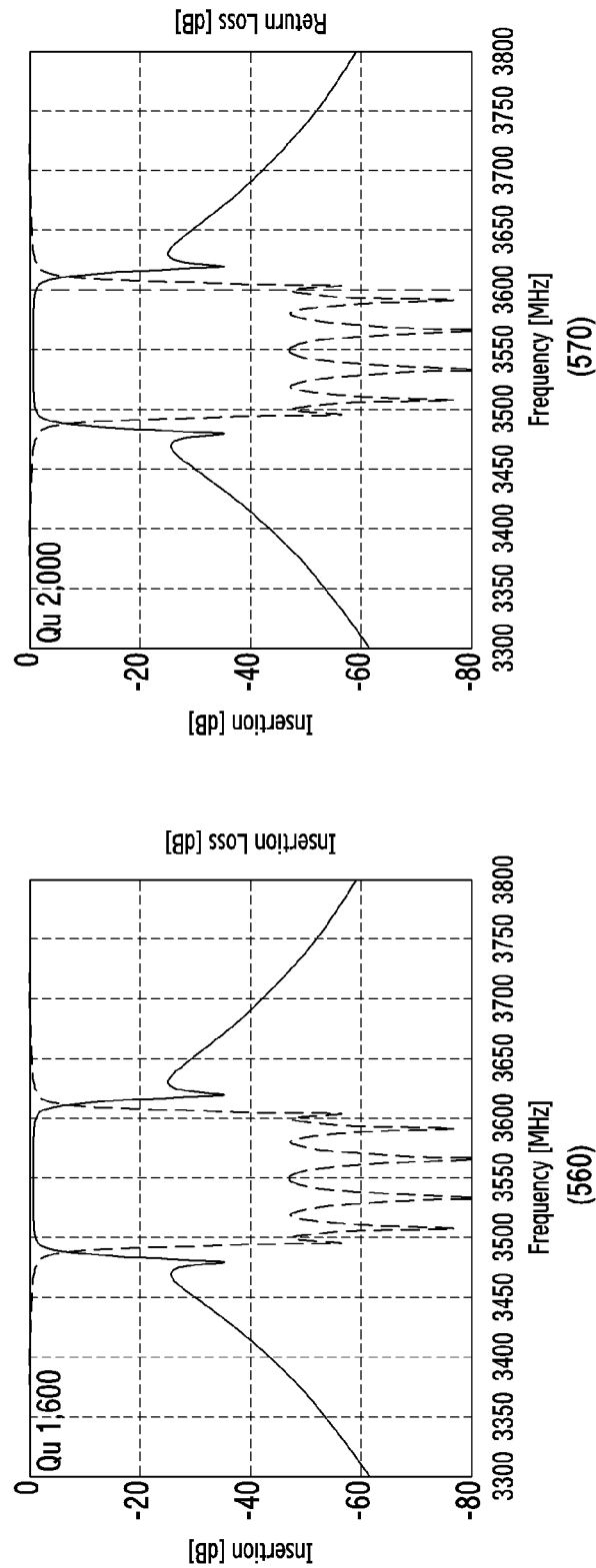
FIG. 5B illustrates performance of an RF filter including a tuning structure according to an embodiment of the disclosure.

FIG. 5B illustrates the performance of an RF filter including a tuning structure according to an embodiment of the disclosure. In FIG. 5B, the performance of an RF filter (e.g., the first RF filter 510) including the existing structure of a tuning bolt and the performance of an RF filter (e.g., the third RF filter 530) including a tuning structure are shown.

Referring to FIG. 5B, first graph 560 shows a relationship between an insertion loss, a return loss, and a frequency which are related to the first RF filter 510. Second graph 570 shows a relationship between an insertion loss, a return loss, and a frequency which are related to the third RF filter 530. As noted from the first graph 560 and the second graph 570, the insertion loss is reduced by about 0.2 dB at the frequency of about 3.5 GHz and the frequency of about 3.6 GHz of the third RF filter 530. This is because, in case of the tuning structure using a cover plate and a tuning structure provided at the cover plate in the same space, the degree of freedom in designing the resonator is increased due to the reduction in the thickness of the cover and the absence of an additional structure. When designing a circuit of a resonator, the range of values of factors (e.g., line length, resistance, inductor component, etc.) affecting the quality factor may increase. This increase in the range may be designed such that the quality factor is further increased within the allowed range (e.g., an area). That is, when an additional design for increasing the quality factor is performed in the resonator of a cavity filter, the quality factor may be increased.

Figure 6:
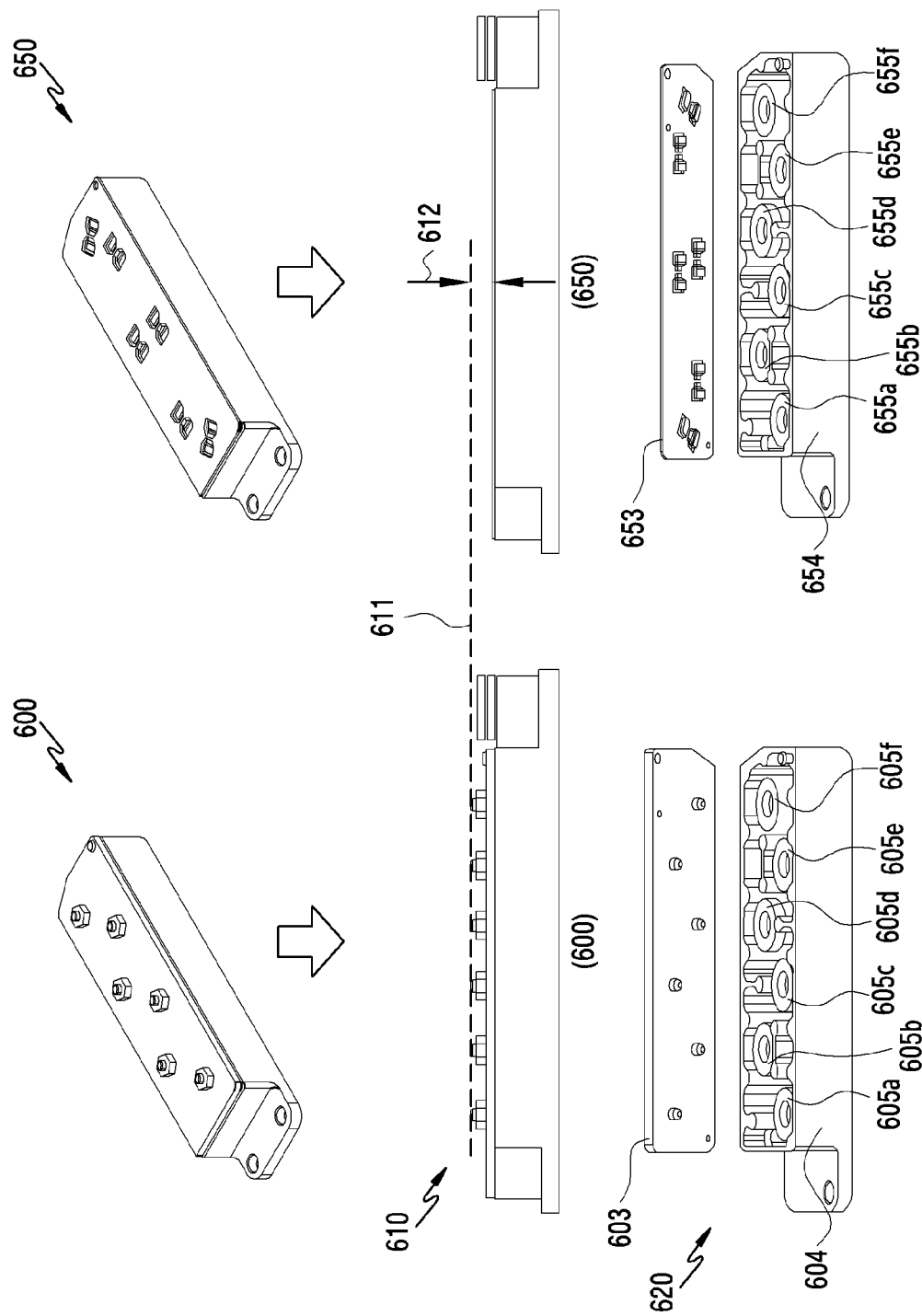
FIG. 6 illustrates an example of application of an RF filter including a tuning structure according to an embodiment of the disclosure.

FIG. 6 illustrates an example of application of an RF filter including a tuning structure according to an embodiment of the disclosure. A resonator in a metal cavity is described as an example of a resonator of the RF filter.

A perspective view, a side view, and an exploded view of each of an RF filter 600 including a tuning bolt and nut and an RF filter 650 including a cover plate at which a tuning structure is formed are respectively shown with reference to FIG. 6.

As noted from perspective view 610, the thickness of the RF filter 650 is reducible by a spacing 612, based on a height 611 of the RF filter 600. As described above, the RF filter 650 includes no additional structure formed due to tuning bolts and nuts, and thus may be configured to have a height relatively lower than that of the RF filter 600. In addition, since the cover for covering the cavity resonator also does not require screws (screw threads/screw grooves), the cover thickness of the RF filter 650 may be thinner than the cover thickness of the RF filter 600.

Referring to exploded view 620, the RF filter 600 may include a cover 603, a housing 604, and resonators 605*a*, 605*b*, 605*c*, 605*d*, 605*e*, and 605*f*. Each resonator may be disposed in a cavity formed in the housing. The cover 603 includes groove regions for receiving tuning bolts. Each groove region is disposed on the cover 603 to correspond to the position of each resonator during assembly. The RF filter 650 may include a cover 653, a housing 654, and resonators 655*a*, 655*b*, 655*c*, 655*d*, 655*e*, and 655*f*. Each resonator may be disposed in a cavity formed in the housing. The cover 653 may include tuning structures (e.g., tuning structures having a see-saw structure and including both ends) for performing tuning through adjustment of a distance from each resonator. Each tuning structure may be disposed on the cover 603 to correspond to the position of each resonator during assembly.

Figure 7:
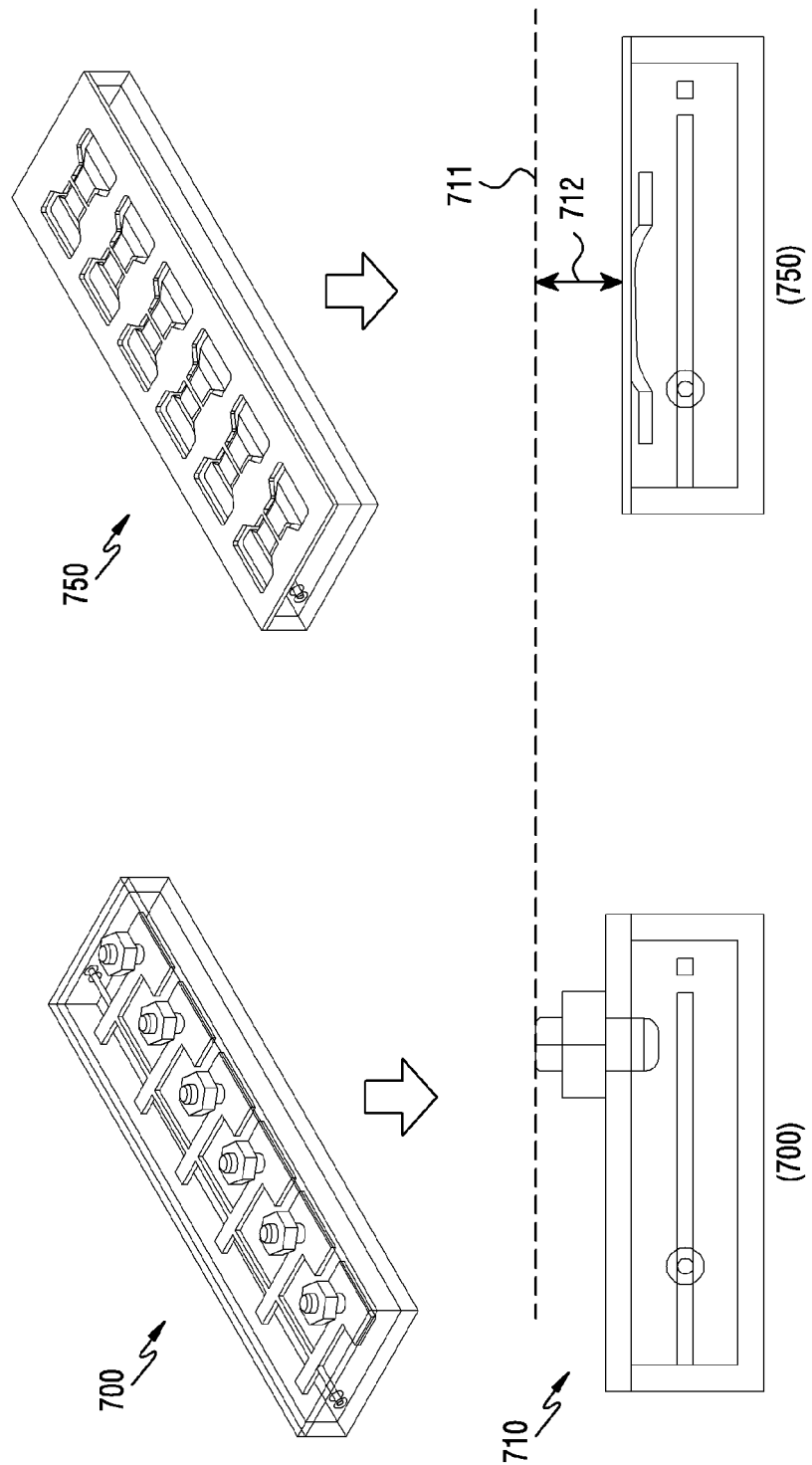
FIG. 7 illustrates another example of application of an RF filter including a tuning structure according to an embodiment of the disclosure.

FIG. 7 illustrates another example of application of an RF filter including a tuning structure according to an embodiment of the disclosure.

In FIG. 6, a metal cavity filter through a resonator disposed in the cavity is described as an example, but the cover plate including the tuning structure of the disclosure may be applied to other types of resonators. According to an embodiment, a substrate-type resonator having a suspended structure may be used instead of the resonance circuit (i.e., resonators corresponding to the respective metal cavities) of the metal cavity filter in FIG. 6. The suspended structure refers to a structure in which a single substrate is disposed between a filter board and a cover, whereby an air layer is formed on each of the upper and lower surfaces of the single substrate. Each resonator formed by the single substrate may include a resonator having a T-shape (hereinafter, referred to as a T-shaped resonator). An additional effect of simplifying an assembly process may be provided by forming a plurality of resonators by using a single substrate.

A perspective view, a side view, and an exploded view of each of an RF filter 700 including a tuning bolt and a tuning nut and an RF filter 750 including a cover plate at which a tuning structure is formed are respectively shown with reference to FIG. 7.

As noted from perspective view 710, the thickness of the RF filter 750 is reducible by a spacing 712, based on a height 711 of the RF filter 700. As described above, the RF filter 750 includes no additional structure formed due to tuning bolts and nuts, and thus may be configured to have a height relatively lower than that of the RF filter 700. In addition, since the cover forming an air layer and the resonator implemented by a suspended substrate also do not require screws (screw threads/screw grooves), the cover thickness of the RF filter 750 may be thinner than the cover thickness of the RF filter 700. Although not shown in FIG. 7, according to an embodiment, the tuning structures in the cover of the RF filter 750 may be disposed at positions corresponding to the resonators on the suspended substrate. The position of the tuning structure may correspond to the position of each resonator such that the capacitance is formed according to the spacing between the resonator and the tuning unit. The position of the tuning structure on the cover plate may be the same as or related to the position of the resonator on the surface of the cover plate parallel to the plane.

Figure 8:
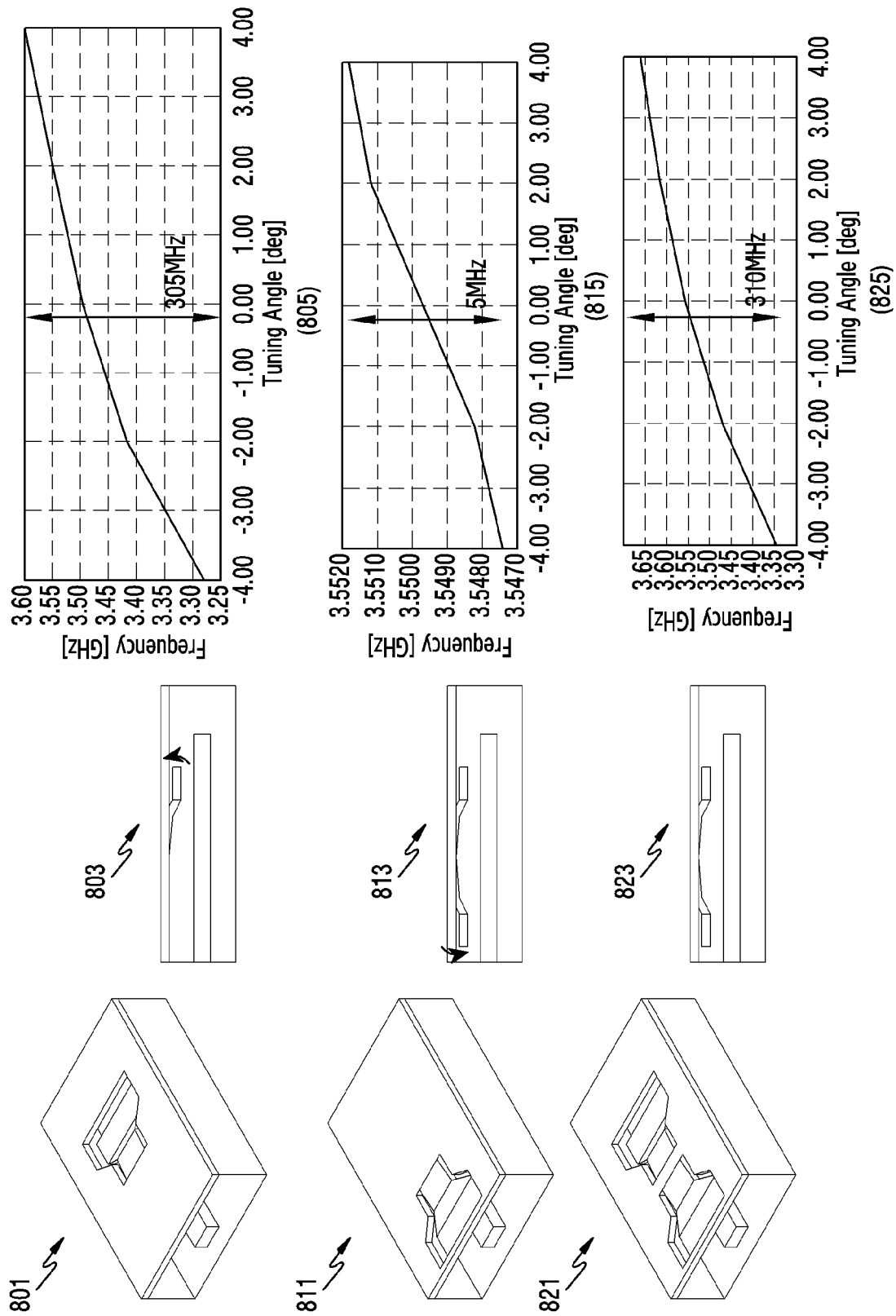
FIG. 8 shows examples of a position of a tuning structure on a cover plate and resultant tuning performance according to an embodiment of the disclosure.

FIG. 8 shows examples of a position of a tuning structure on a cover plate and resultant tuning performance according to an embodiment of the disclosure. According to the position of the tuning structure on the cover plate, the tuning range is determined. An RF filter including a T-shaped resonator of the suspended substrate structure shown in FIG. 7 is described as an example.

Referring to FIG. 8, a first RF filter 801 may include a cover plate including a tuning structure. On the cover plate, the tuning structure may be disposed at a position corresponding to a head portion (wide width portion) of the T-shaped resonator. Referring to side view 803, the tuning structure of the first RF filter 801 may be repeatedly inserted or restored. The tuning structure of the first RF filter 801 may be disposed between the cover plate and the resonator. As the height of the tuning structure varies relative to the resonator, a range for variation of the resonance frequency may also vary. First graph 805 shows a range of the resonance frequency according to the rotation angle of the tuning structure around the fixing unit. The tuning structure of the first RF filter 801 has a resonance frequency variation range of about 305 MHz in a range of (−)4 degrees to (+)4 degrees.

A second RF filter 811 may include a cover plate including a tuning structure. On the cover plate, the tuning structure may be disposed at a position corresponding to a tail portion (narrow width portion) of the T-shaped resonator. Referring to side view 813, the tuning structure of the second RF filter 811 may be repeatedly inserted or restored. The tuning structure of the second RF filter 811 may be disposed between the cover plate and the resonator. As the height of the tuning structure varies relative to the resonator, a range for variation of the resonance frequency may also vary. Second graph 815 shows a range of the resonance frequency according to the rotation angle of the tuning structure around the fixing unit. Since the tuning structure is disposed at a relatively long distance from the head portion of the T-shaped resonator, a range for tuning the resonance frequency may be relatively narrow compared to the first RF filter 801. The tuning structure of the second RF filter 811 has a resonance frequency variation range of about 5 MHz in the range of (−)4 degrees to (+)4 degrees.

A third RF filter 821 may include a cover plate including a tuning structure. On the cover plate, the tuning structures may be disposed at positions corresponding to the head portion (wide width portion) of the T-shaped resonator and the tail portion (narrow width portion) of the T-shaped resonator, respectively. That is, the third RF filter 821 may include tuning structures having a see-saw structure as shown in FIG. 3B. Referring to side view 823, the tuning structures of the third RF filter 821 may be repeatedly inserted or restored. The tuning structures of the third RF filter 821 may be disposed between the cover plate and the resonator. As the heights of the tuning structures vary relative to the resonator, the range of the resonance frequency may also vary. The effect of varying the resonance frequency due to the movement of the tuning structures may be further enhanced because when one end of the tuning structure rises, the other end thereof descends. Third graph 825 shows a range for variation of the resonance frequency according to the rotation angle of the tuning structures around the fixing unit. By the two tuning structures controllable together, coupled and attached to the cover plate, and having a see-saw structure, the range for variation of the resonance frequency according to the movement range of the tuning structure may become wider than that in the case of a tuning structure disposed only on one side thereof. The tuning structures of the third RF filter 821 have a resonance frequency variation range of about 320 MHz (=315 MHz+5 MHz) in the range of (−) 4 degrees to (+)4 degrees.

Figure 9:
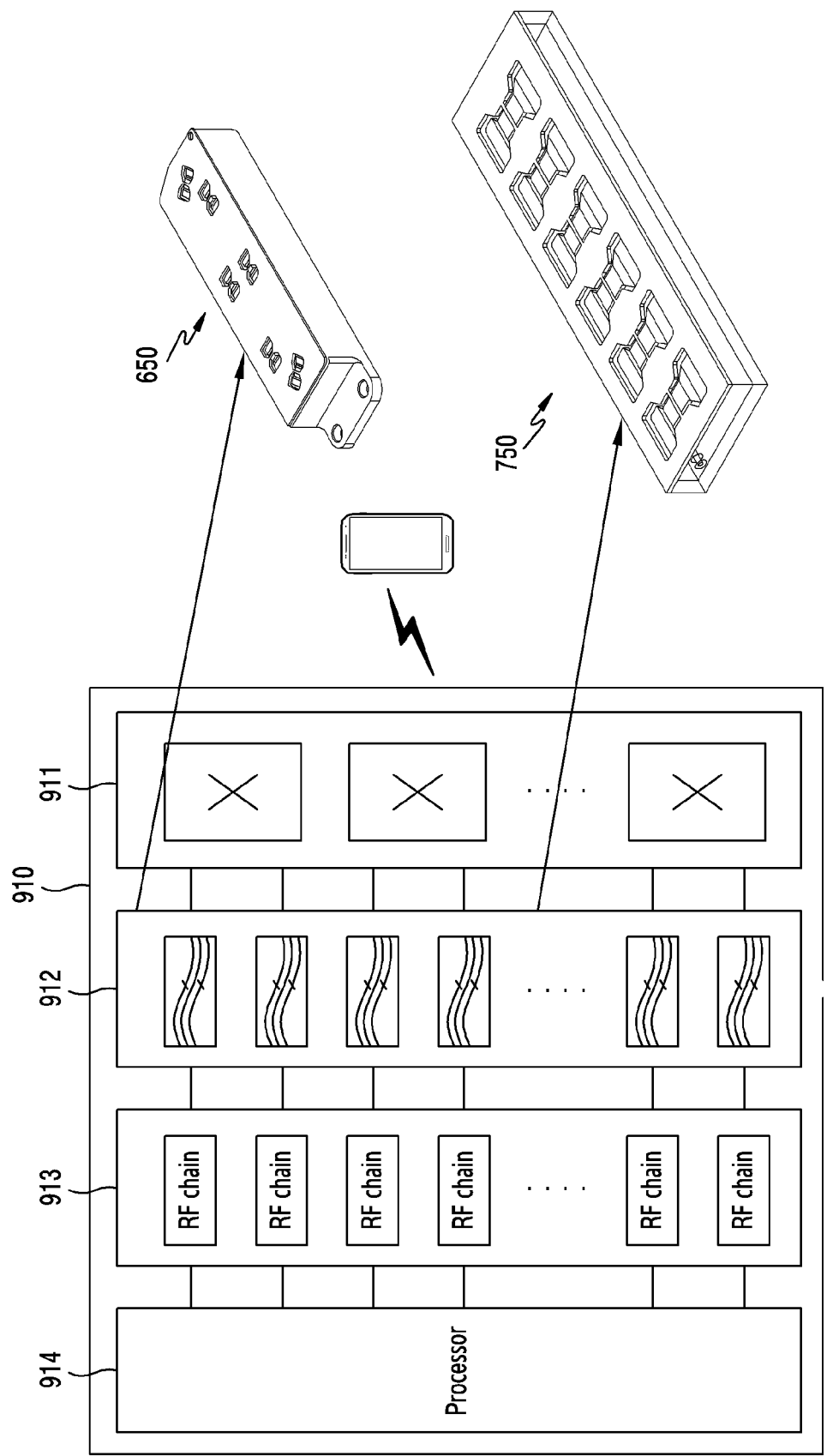
FIG. 9 illustrates a functional configuration of an electronic device including a tuning structure according to an embodiment of the disclosure.

FIG. 9 illustrates a functional configuration of an electronic device including a tuning structure according to an embodiment of the disclosure.

An electronic device 910 may be either the base station 110 or the terminal 120 in FIG. 1A. According to an embodiment, the electronic device 910 may be an MMU. In addition to the antenna structure itself mentioned through FIGS. 1A, 1B, 2, 3A, 3B, 3C, 4A, 4B, 5A, 5B, 6, 7, and 8, the electronic device including the same is also included in the embodiments of the disclosure. The electronic device 910 may include a filter having a suspended structure in the input/output path of an RF signal.

A functional configuration of the electronic device 910 is shown with reference to FIG. 9. The electronic device 910 may include an antenna unit 911, a filter unit 912, a radio frequency (RF) processing unit 913, and a controller 914.

The antenna unit 911 may include a plurality of antennas. The antenna performs functions for transmitting and receiving signals through a radio channel. The antenna may include a conductor disposed on a substrate (e.g., a PCB) or a radiator formed of a conductive pattern. The antenna may radiate an up-converted signal on a radio channel or acquire a signal radiated by another device. Each antenna may be referred to as an antenna element or antenna device. In some embodiments, the antenna unit 911 may include an antenna array in which a plurality of antenna elements form an array. The antenna unit 911 may be electrically connected to the filter unit 912 through RF signal lines. The antenna unit 911 may be mounted on a PCB including a plurality of antenna elements. The PCB may include a plurality of RF signal lines connecting a filter of the filter unit 912 to each antenna element. The RF signal lines may be referred to as a feeding network. The antenna unit 911 may provide a received signal to the filter unit 912 or may radiate a signal provided from the filter unit 912 into the air.

The filter unit 912 may perform filtering to transmit a signal of a desired frequency. The filter unit 912 may form resonance to perform a function for selectively identifying frequencies. According to various embodiments, the filter unit 912 may include a cover plate at which a tuning structure is formed according to various embodiments of the disclosure. The filter unit 912 may include a cavity filter (e.g., a filter in which a resonator is disposed in a metal cavity or a filter including a T-shaped resonator of a suspended substrate) and a cover plate. At this time, one region of the cover plate may be cut, and a tuning member serving as a tuning structure may be disposed in an aperture formed by the cut. Alternatively, according to an embodiment, a partial region of the same cover plate member may be formed as a tuning structure. The tuning structure may be a structure having an adaptive arrangement according to pressure, with respect to the fixing unit as a part of the cover plate. In other words, the tuning member, which is inserted or restored, may be configured integrally with the cover plate (a tuning structure included in the aperture of the cover plate may also be understood as an embodiment of the disclosure). A resonance frequency may be determined according to a position relative to the resonator according to the movement of the tuning structure. The resonance frequency may be adjusted by adjusting the capacitance value through the tuning structure movable with respect to the cover plate (e.g., when fixing the cover plate). According to an embodiment, the filter unit 912 may include the RF filter 650 in FIG. 6. In addition, according to an embodiment, the filter unit 912 may include the RF filter 750 in FIG. 7.

The filter unit 912 may include at least one of a band pass filter, a low pass filter, a high pass filter, and a band reject filter. That is, the filter unit 912 may include RF circuits for obtaining a signal of a frequency band for transmission or a frequency band for reception. The filter unit 912 according to various embodiments may electrically connect the RF processing unit 913 to the antenna unit 911.

The RF processing unit 913 may include a plurality of RF paths. The RF path may be a unit of a path through which a signal received through an antenna or a signal radiated through an antenna passes. At least one RF path may be referred to as an RF chain. The RF chain may include a plurality of RF elements. The RF elements may include amplifiers, mixers, oscillators, digital-to-analog converters (DACs), analog-to-digital converters (ADCs), and the like. For example, the RF processing unit 913 may include an up converter that up-converts a baseband digital transmission signal into a transmission frequency, and a digital-to-analog converter (DAC) that converts the up-converted digital transmission signal into an analog RF transmission signal. The up converter and DAC form part of a transmit path. The transmit path may further include a power amplifier (PA) or a coupler (or combiner). In addition, for example, the RF processing unit 913 may include an analog-to-digital converter (ADC) that converts an analog RF reception signal into a digital reception signal, and a down converter that converts a digital reception signal into a baseband digital reception signal. The ADC and down converter form part of a receive path. The receive path may further include a low-noise amplifier (LNA) or a coupler (or divider). RF components of the RF processing unit may be implemented on a PCB. The electronic device 910 may include a structure including the antenna unit 911, the filter unit 912, and the RF processing unit 913 which are stacked in this order. The antennas and RF components of the RF processing unit may be implemented on the PCB, and filters may be repeatedly fastened between a PCB and another PCB to form a plurality of layers.

The controller 914 may control overall operations of the electronic device 910. The controller 914 may include various modules for performing communication. The controller 914 may include at least one processor such as a modem. The controller 914 may include modules for digital signal processing. For example, the controller 914 may include a modem. During data transmission, the controller 914 generates complex symbols by encoding and modulating transmitted bit streams. In addition, for example, when data is received, the controller 914 restores received bit stream by demodulating and decoding a baseband signal. The controller 914 may perform functions of a protocol stack required by a communication standard.

In FIG. 9, the functional configuration of the electronic device 910 is described as equipment to which the antenna structure of the disclosure may be utilized. However, the example shown in FIG. 9 is only an example of a configuration for utilizing the RF filter structure according to various embodiments of the disclosure described through FIGS. 1A, 1B, 2, 3A, 3B, 3C, 4A, 4B, 5A, 5B, 6, 7, and 8, and embodiments of the disclosure are illustrated are not limited to the components of the equipment in FIG. 9. Accordingly, an antenna module including an antenna structure, communication equipment having a different configuration, and an antenna structure itself may also be understood as embodiments of the disclosure.

According to an embodiment of the disclosure, a radio frequency (RF) filter in a wireless communication system may include a structure including a resonance unit and a cover plate at which a tuning structure is formed, and the tuning structure is configured to have a flexible arrangement with respect to the cover plate, through an opening in the cover plate.

According to an embodiment of the disclosure, the tuning structure may be formed by at least a portion of a member corresponding to the opening in the cover plate, wherein the member has at least one region connected to the cover plate.

According to an embodiment of the disclosure, the tuning structure may be formed integrally with the cover plate.

According to an embodiment of the disclosure, the cover plate may be formed by a metal plate, and the tuning structure may be formed by at least a portion of the metal plate corresponding to the opening.

According to an embodiment of the disclosure, the flexible arrangement may include one of a plurality of arrangements with respect to the cover plate, and the plurality of arrangements correspond to distances between different tuning structures and a resonator of the resonance unit, respectively.

According to an embodiment of the disclosure, the tuning structure may be disposed in at least a partial region of the opening in the cover plate, and may have an arrangement movable up and down with respect to the cover plate.

According to an embodiment of the disclosure, the structure may include one or more metal cavities and a resonator disposed in each of the one or more metal cavities.

According to an embodiment of the disclosure, the structure may include a resonance substrate in which one or more resonators are formed as a single layer, and the resonance substrate is disposed between the cover plate and the filter board.

According to an embodiment of the disclosure, the tuning structure on the cover plate may be disposed in a region corresponding to the position of the resonator of the resonance unit on the filter board.

According to an embodiment of the disclosure, the tuning structure may be connected to the cover plate through a fixing unit, and the tuning structure may have a movable arrangement with respect to the fixing unit.

According to an embodiment of the disclosure, the tuning structure may include structures having a see-saw structure including a first end and a second end, and the first end of the tuning structure may be arranged to be symmetrical with the second end of the tuning structure with respect to the fixing unit.

According to an embodiment of the disclosure, the resonance frequency of the RF filter may depend on a distance between the tuning structure and the resonator of the resonance unit.

According to an embodiment of the disclosure, the tuning structure may correspond to one region of the cover plate, and the one region may be flexibly disposed such that a distance to the resonator of the resonance unit is variable.

According to embodiments of the disclosure, a massive multiple-input multiple-output (MIMO) unit (MMU) device in a wireless communication system may include: at least one processor configured to process a signal; a plurality of radio frequency (RF) filters configured to filter a signal; and an antenna array configured to radiate a signal, wherein an RF filer among the plurality of RF filters may include a structure including a resonance unit and a cover plate in which a tuning structure is formed, and wherein the tuning structure may be configured to have a flexible arrangement with respect to the cover plate through an opening of the cover plate.

According to an embodiment of the disclosure, the cover plate may be formed by a metal plate, and the tuning structure may be formed by at least a portion of the metal plate corresponding to the opening.

According to an embodiment of the disclosure, the structure may include one or more metal cavities and a resonator disposed in each of the one or more metal cavities.

According to an embodiment of the disclosure, the structure may include a resonance substrate in which one or more resonators are formed as a single layer, and the resonance substrate may be disposed between the cover plate and the filter board.

According to an embodiment of the disclosure, the tuning structure on the cover plate may be disposed in a region corresponding to the position of the resonator of the resonance unit on the filter board.

According to an embodiment of the disclosure, the resonance frequency of the RF filter may depend on a distance between the tuning structure and the resonator of the resonance unit.

According to an embodiment of the disclosure, the tuning structure may correspond to one region of the cover plate, and the one region may be flexibly disposed such that a distance to the resonator of the resonance unit is variable.

The existing tuning operation using tuning bolts and nuts and the tuning operation using the tuning structure formed on the cover plate according to embodiments of the disclosure were compared through FIGS. 1A, 1B, 2, 3A, 3B, 3C, 4A, 4B, 5A, 5B, 6, 7, 8, and 9. Since the tuning operation of the tuning bolt according to a groove having a specified size is possible in case of the tuning operation using tuning bolts and nuts, the control range of the resonance frequency according to the movement of the tuning bolt is somewhat limited. However, in a method for forming a tuning structure on a cover plate according to various embodiments of the disclosure, the shape, area, position, and arrangement of the tuning structure may be easily (e.g., linearly) designed according to the tuning range of a required resonance frequency and space constraint, so the degree of freedom and the range of tuning are wider than those of the existing tuning bolt method. Such a high degree of freedom may allow more effective tuning operation by the automatic adjustment device according to an embodiment. Meanwhile, as described above, it should be noted that the tuning structure according to embodiments of the disclosure may be configured in various shapes as well as the illustrated shape. Any shape which allows adjustment of a distance to a resonator through a flexible arrangement as a part of the cover plate, such as a circular or columnar plate as well as a stepped plate, may be understood as an embodiment of the disclosure.

As communication equipment is implemented in a form in which a plurality of RF parts are assembled, tolerances occurring every time the RF parts are assembled increase, which may cause performance degradation. Even if the same function is performed, a cost for satisfying communication performance required due to a structural difference and an electrical characteristic difference may also act as an overhead. In order to harmonize space constraints, cost limitations due to mass production, and accumulated tolerances, the connection structure between multiple filters and multiple RF components becomes a very important factor in the electrical/mechanical/price competitiveness of products.

Through the cover plate structure in which the tuning structure is formed according to various embodiments of the disclosure, a wider tuning range is secured and, a tuning operation is easier than a tuning operation using tuning bolts and nuts. As such, simplification and versatility considered in the arrangement of the tuning structure in which the distance between the resonator and the tuning structure in a three-dimensional space is considered may further improve the performance of communication equipment including a great quantity of RF parts.

A method for reducing the volume/weight of an RF filter and improving performance thereof through a simplification of a characteristic tuning structure has been described through various embodiments of the disclosure. As noted from each graph, the filter can have reduced volume and weight and the characteristics thereof can be improved through the cover which includes a tuning structure and can be formed relatively thin. The cover single part including a tuning member disposed on the cover plate, rather than the existing tuning structure including various complex parts (e.g., tuning bolts, nuts, grooves), may provide volume/weight reduction and allow relatively free adjustment of spacing due to insertion/restoration, and thus may provide a wide tuning range and improve characteristics.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A radio frequency (RF) filter in a wireless communication system, the RF filter comprising:
a structure comprising a resonance unit; and
a cover plate at which a tuning structure is formed,
wherein the tuning structure is disposed in at least a partial region of an opening in the cover plate, and
wherein the tuning structure comprises is configured to move up and down in respect to the cover plate through the opening in the cover plate.

2. The RF filter of claim 1,
wherein the tuning structure is formed by at least a portion of a member corresponding to the opening in the cover plate, and
wherein the member comprises at least one region connected to the cover plate.

3. The RF filter of claim 1, wherein the tuning structure is integrally formed with the cover plate.

4. The RF filter of claim 1,
wherein the cover plate comprises a metal plate, and
wherein the tuning structure comprises at least a portion of the metal plate corresponding to the opening.

5. The RF filter of claim 1,
wherein the tuning structure configured to move up and down comprises one of a plurality of arrangements with respect to the cover plate, and
wherein the plurality of arrangements correspond to distances between different tuning structures and a resonator of the resonance unit, respectively.

6. The RF filter of claim 1, wherein the structure comprises one or more metal cavities and a resonator disposed in each of the one or more metal cavities.

7. The RF filter of claim 1,
wherein the structure comprises a resonance substrate in which one or more resonators are formed as a single layer, and
wherein the resonance substrate is disposed between the cover plate and a filter board.

8. The RF filter of claim 1, wherein the tuning structure on the cover plate is disposed in a region corresponding to a position of a resonator of the resonance unit on a filter board.

9. The RF filter of claim 1,
wherein the tuning structure is connected to the cover plate through a fixator, and
wherein the tuning structure comprises a movable arrangement with respect to the fixator.

10. The RF filter of claim 9,
wherein the tuning structure comprises structures having a see-saw structure comprising a first end and a second end, and
wherein the first end of the see-saw structure of the tuning structure is arranged to be symmetrical with the second end of the see-saw structure of the tuning structure with respect to the fixator.

11. The RF filter of claim 1, wherein a resonance frequency of the RF filter depends on a distance between the tuning structure and a resonator of the resonance unit.

12. The RF filter of claim 1,
wherein the tuning structure corresponds to one region of the cover plate, and
wherein the one region is flexibly disposed such that a distance to a resonator of the resonance unit is variable.

13. A massive multiple-input multiple-output (MIMO) unit (MMU) device in a wireless communication system, the MMU device comprising:
at least one processor;
a plurality of radio frequency (RF) filters; and
an antenna array configured to radiate a signal, wherein an RF filer among the plurality of RF filters comprises a structure comprising a resonance portion and a cover plate at which a tuning structure is formed, and wherein the tuning structure comprises a flexible arrangement with respect to the cover plate through an opening of the cover plate.

14. The MMU device of claim 13, wherein the cover plate comprises a metal plate, and wherein the tuning structure comprises at least a portion of the metal plate corresponding to the opening.

15. The MMU device of claim 13, wherein the tuning structure is free of any screws and nuts of a tuning bolt.

16. The MMU device of claim 13, wherein the tuning structure comprises a see-saw structure, and wherein the cover plate comprises a fixator in a fixing region for balancing the see-saw structure.

17. The MMU device of claim 16, wherein a spatial arrangement of the tuning structure is determined by adjustment operations comprising at least one of a hit or a press applied to the see-saw structure.

\* \* \* \* \*